Patented Sept. 26, 1922.

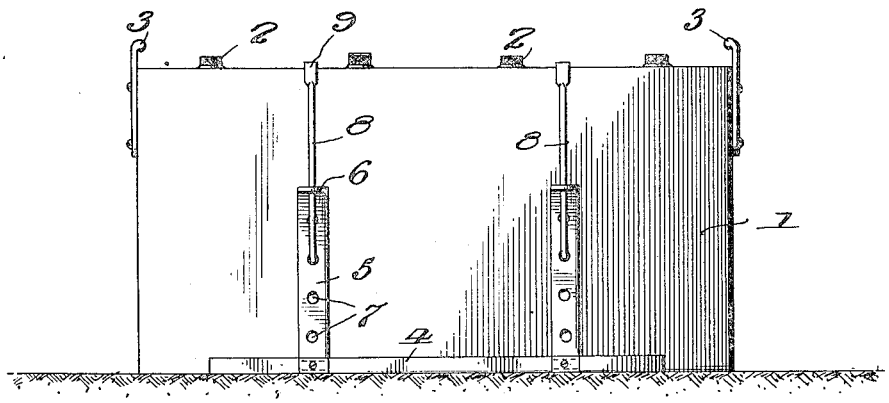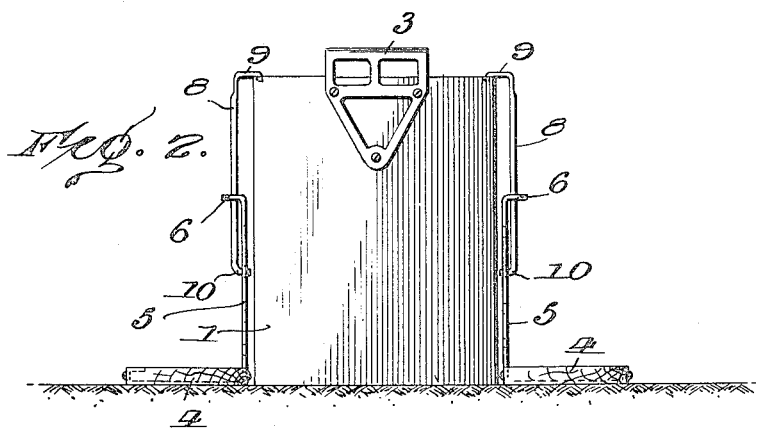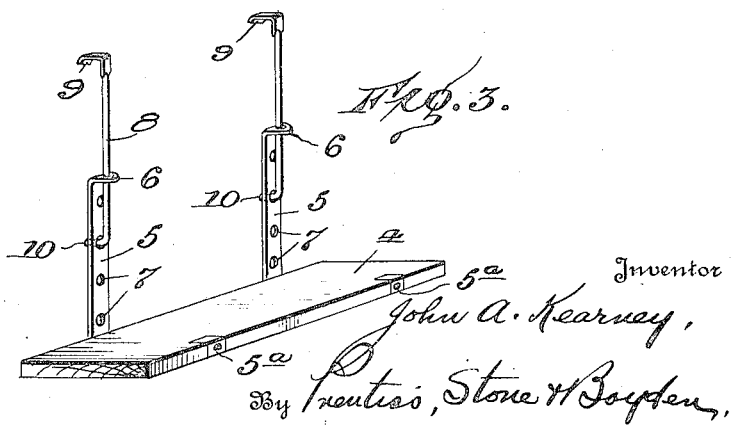

1,429,952

UNITED STATES PATENT OFFICE.

JOHN A. KEARNEY, OF WILSON, NORTH CAROLINA.

HOLDDOWN DEVICE.

Application filed March 18, 1921. Serial No. 453,301.

*To all whom it may concern:*

Be it known that I, JOHN A. KEARNEY, a citizen of the United States, residing at Wilson, in the county of Wilson and State of North Carolina, have invented certain new and useful Improvements in Holddown Devices, of which the following is a specification.

This invention relates to a hold-down device especially adapted for use in connection with the storage batteries of motor vehicles.

As is well known, considerable difficulty is often experienced in withdrawing the plates from the casing of such batteries, when it is necessary to repair or renew the same, and it is the common practice to provide garages and repair shops with apparatus known as floor vises, the purpose of which is to grip and hold such battery cases so as the plates may be removed therefrom. These floor vises are, of course, fixed in position, and it is necessary to carry the batteries to the vise in order to use the same. As these storage batteries, containing as they usually do a great deal of lead, are quite heavy, it oftens becomes a matter of considerable difficulty to carry or transport a battery from a vehicle to one of these floor vises. The object of the present invention is, therefore, to avoid the necessity of thus carrying a battery to a fixed floor vise for the purpose of withdrawing the plates, and to this end I seek to provide an improved apparatus in the nature of a portable vise or hold-down, which, being small and light, can be readily brought up to a battery, wherever located. Specifically, I propose to provide a hold-down device of this character which does not require to be fastened to the floor in any way, but which is rendered effective simply by the pressure of the foot of the operator on a suitable plate or base.

In order that the invention may be readily understood, reference is had to the accompanying drawings, forming part of this specification, and in which—

Fig. 1 is a side elevation of a battery box or case showing one of my improved hold-down devices applied thereto.

Fig. 2 is an end elevation of a battery box or case with one of my improved hold-down devices applied to each side thereof; and Fig. 3 is a perspective view of one of the improved hold-down devices.

Referring to the drawings in detail, 1 designates a battery box, case or other receptacle, in which are located the usual plates, having terminals 2. A bracket or handle 3 is usually provided at each end of the box by which it may be lifted.

My improved hold-down devices are usually employed in pairs, one on each side of the box or container, as shown in Fig. 2. Each such device comprises a base-board or foot plate 4, preferably made of wood, and of such dimensions as to readily accommodate the foot of the operator. Secured to the base-board 4 are a pair of upstanding members or brackets 5, having their ends bent over and provided with openings, as indicated at 6. These bracket members 5 may be secured to the base-board 4 in any desired manner, but as shown these members are in the form of relatively thin metal strips which are carried underneath the foot plate or board 4 and have their ends bent up around the edge of the same as indicated at 5ª in Fig. 3. Preferably the members 5 are let into the under side of the plate or board 4 so as to be flush with the surface thereof.

Passing loosely through the holes in the bent over ends 6 of the members 5 are a pair of hook members which comprise a shank 8 carrying a hook 9 at its upper end. The lower end of the shank 8 is bent at right angles as indicated at 10, and such bent end is adapted to engage in any desired one of a series of perforations 7, formed in the member 5. It will thus be clear that by inserting the bent end 10 into different perforations 7, the height of the hook 9 above the foot plate or board may be adjusted as desired.

In using the apparatus, the hooks 9 are adjusted to the proper height and are then caused to engage over the upper edge of the battery box or container as shown in Fig. 2, one of the hold-down devices being employed on each side of the box or container. The operator then stands with one foot on each of the boards or foot plates 4, and when in this position can readily grasp the battery plates and exert an upward pull on them, at the same time pressing down on the plates 4 with his feet. In this way the upward pull reacts against the downward thrust, so that the greater the necessary pull, the greater will be the hold-down effect.

From the above, it will, therefore, be understood that my improved hold-down device can be readily brought up and placed in position in engagement with a battery box or case, wherever the same may be located, and it, therefore, is not necessary to carry such battery to any particular spot in order to hold it. It is obvious, therefore, that I have provided an exceedingly simple, cheap and effective hold-down device, and it is thought that the many advantages thereof will be fully appreciated without further discussion.

What I claim is:—

1. A portable hold-down device comprising a hook, and a foot plate to which the hook is adjustably secured.

2. A portable hold-down device comprising an elongated foot plate, and a pair of vertically disposed hook members carried by said plate.

3. A portable hold-down device comprising an elongated foot plate, and a pair of vertically disposed hook members secured to and extending upwardly from one side edge of said plate.

4. A device for holding down containers and the like, comprising a portable footplate adapted to be moved up to the container, and a hook carried by said plate and adapted to engage over the edge of the containers.

5. A hold-down device comprising a footplate, a vertically disposed bracket member carried thereby, and provided with a series of perforations, said member having a guide at its upper end, and a hook member having its lower end passing through said guide and bent so as to engage any one of said perforations.

6. A hold-down device comprising a pair of similar independent units, each unit consisting of a portable foot plate and an upstanding hook secured thereto and adapted to engage over the article to be held, such article being positioned between said units.

In testimony whereof I affix my signature.

JOHN A. KEARNEY.